United States Patent [19]

Aoki et al.

[11] Patent Number: 4,934,428

[45] Date of Patent: Jun. 19, 1990

[54] HEAVY DUTY PNEUMATIC RADIAL TIRE

[75] Inventors: Yasutoshi Aoki; Kuninobu Kadota, both of Kodaira, Japan

[73] Assignee: Bridgestone Corporation, Tokyo, Japan

[21] Appl. No.: 280,807

[22] Filed: Dec. 7, 1988

[30] Foreign Application Priority Data

Dec. 7, 1987 [JP] Japan ................. 62-307720

[51] Int. Cl.⁵ .............................. B60C 9/18
[52] U.S. Cl. .................... 152/532; 152/537
[58] Field of Search ............ 152/532, 531, 537, 527, 152/451

[56] References Cited

U.S. PATENT DOCUMENTS

| | | | |
|---|---|---|---|
| 3,126,042 | 3/1964 | Cegnar | 152/533 |
| 4,172,487 | 10/1979 | Suzuki et al. | 152/537 X |
| 4,402,356 | 9/1983 | Musy | 152/209 R |

FOREIGN PATENT DOCUMENTS 2734586  2/1979  Fed. Rep. of Germany ...... 152/532
0815055  6/1959  United Kingdom ............... 152/531

*Primary Examiner*—Raymond Hoch
*Attorney, Agent, or Firm*—Sughrue, Mion, Zinn, Macpeak & Seas

[57] ABSTRACT

A heavy duty pneumatic radial tire includes a toroidal carcass consisting of plies having cords arranged in parallel with each other, and a plurality of belt layers interposed between the carcass and a tread of the tire. At least one of the plies has turn-up portions folded about a pair of bead cores from inside to outside of the tire. The tire comprises a crown protective layer arranged between the belt layers and the tread. The crown protective layer comprises wave-form cords or wave-form filaments. The tire further comprises a cushion rubber layer arranged radially inward of the protective layer and made of a rubber having a modulus less than 70 kg/cm² under 100% elongated condition. A distance between cords of a radially outermost layer of the belt layers and the wave-form cords or the wave-form filaments of the radially innermost layer of the crown protective layer is more than 1.5 mm.

13 Claims, 2 Drawing Sheets

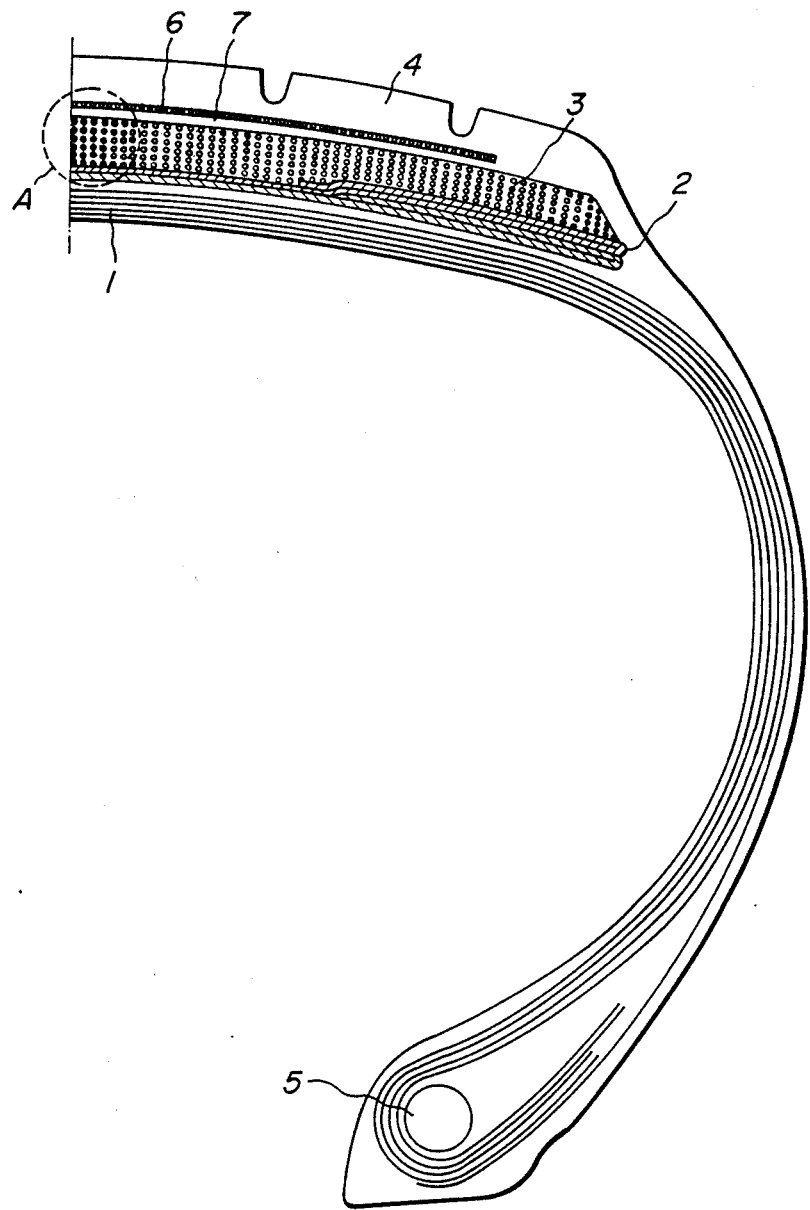
FIG_1

FIG_2a
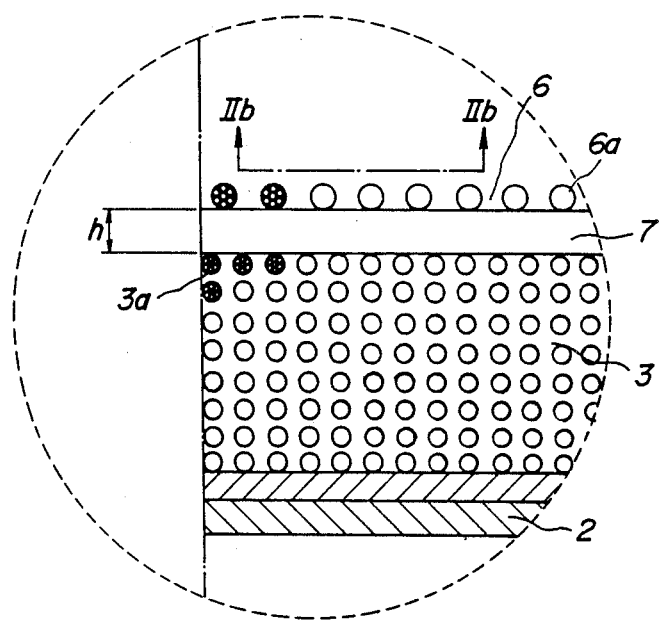
FIG_2b
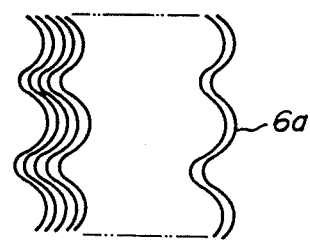

HEAVY DUTY PNEUMATIC RADIAL TIRE

BACKGROUND OF THE INVENTION

This invention relates to a heavy duty pneumatic radial tire to be used under high inner pressure and heavy load. In particular it relates to a pneumatic radial tire for an aircraft, which is able to prevent damage of the tire resulting from external cuts in a tread of the tire.

Tread surfaces of pneumatic tires are often cut by stones and metal pieces dispersed on roads when the tires run thereon. With pneumatic tires adapted to be used for light loads as in passenger cars, even if the tires are cut to certain extends, they are scarcely burst due to cuts in treads of the tires because the conditions of use are not severe. However, with pneumatic tires used under conditions of high inner pressure, heavy load and high speed as in aircraft, external cuts in treads immediately result in a burst of the tires.

In general, bias tires are used for aircraft for the following reason. As the carcass is bias and includes many ply layers, it is possible to arrange on radially inner side of a tread a crown protective layer having a plurality of plies including organic fiber cords intersecting with each other. Therefore, even if the tread is externally cut by foreign pieces on a road surface, any enlargement of cuts in the tread is effectively prevented between the crown protective layer and the carcass plies.

On the other hand, pneumatic radial tires having carcasses of plies including radially arranged cords are unsuitable for aircraft for the following reason. As the carcass includes only a few plies and belt layers include circumferential belt layers, even if a crown protective layer having intersecting layers of organic fiber cords is provided, the tire is unable to prevent enlargement of external cuts in treads under severe condition in an aircraft.

A radial tire for an aircraft is disclosed in United States Patent Specification No. 4,402,356 which discloses a feature of using wave-form steel cords for protecting a crown.

When the wave-form steel cords are used in crown protective layers, it is possible to prevent development of external cuts in treads. However, as there is a great difference in rigidity between the crown protective layer and belt layers, cracks would occur between the crown protective layer and belt layers in the event that the tire is subjected to heavy load as in landing of an aircraft or going over protrusions on roads.

SUMMARY OF THE INVENTION

It is a primary object of the invention to provide an improved heavy duty pneumatic radial tire which eliminates all the disadvantages in the prior art and prevent cracks apt to occur between a crown protective layer and belt layers of a pneumatic radial tire used under conditions of high inner pressure and heavy load as for an aircraft, and further facilitates recapping of the tire.

In order to achieve this object, in a heavy duty pneumatic radial tire including a toroidal carcass consisting of plies having cords arranged in parallel with each other, at least one of the plies having turnup portions folded about a pair of bead cores from inside to outside of the tire and, a plurality of belt layers interposed between said carcass and a tread of the tire, according to the invention the tire comprises a crown protective layer arranged between the belt layers and the tread and comprising either of wave-form cords and wave-form filaments, and a cushion rubber layer arranged radially inward of the crown protective layer and made of a rubber having a modulus less than 70 kg/cm$^2$ under 100% elongated condition, and a distance between cords of a radially outermost layer of said belt layer and either of wave-form cords and wave-form filaments of a radially innermost layer of said crown protective layer being more than 1.5 mm.

In this case, the distance between cords of the radially outermost layer of the belt layers and the wave-form cords is the distance h between surfaces of the cords as shown in a sectional view of FIG. 2a, wherein h is the distance between cords of the radially outermost layer of the belt layers and the radially innermost wave-form cords of the crown protective layer.

With the heavy duty tire according to the invention, the distance h less than 4.5 mm is preferable with respect to weight and heating of the tire. If the distance h is more than 4.5 mm, a volume of the entire tread of the tire is excessively increased so that durability at high speeds is often extremely reduced.

In view of productivity, the modulus of the cushion rubber layer under 100% elongated condition is preferably more than 20 kg/cm$^2$.

In order that the invention may be more clearly understood, preferred embodiments will be described, by way of example, with reference to the accompanying drawings.

BRIEF DESCRIPTION OF THE DRAWING

FIG. 1 is an explanatory sectional view of a tire according to the invention;

FIG. 2a is an enlarged schematic sectional view of the portion circumscribed in dash line A in FIG. 1; and FIG. 2b is a sectional view illustrating wave-form cords taken along the line IIb—IIb in FIG. 2a.

DESCRIPTION OF THE PREFERRED EMBODIMENT

FIG. 1 illustrates a construction of the tire according to the invention, which comprises a carcass 1, an intersecting belt layer 2, a circumferential belt layer 3, a tread 4, bead cores 5, a crown protective layer 6, and a cushion rubber layer 7.

In this embodiment, the carcass 1 consists of an up-down laminated layer comprising four turn-up plies folded or wound from inside to outside about the bead cores 5 and a down ply extending to bead toes along the outsides of the turn-up portions of the turn-up plies.

The intersecting belt layer comprises two plies having organic fiber cords, which are folded or doubled at both sides to add two plies on both sides of the tread. In this manner, there are two plies at the center of the tread and four plies at both the sides of the tread. In this embodiment, moreover, folded ends of the outer ply of the intersecting belt layer are arranged so as to enclose folded ends of the inner ply in order to prevent shearing strains at the folded ends of the inner ply.

The circumferential belt layer 3 comprises five cord layers whose cords are made of the same organic fibers as those of the intersecting belt layer and are wound spirally in circumferential directions of the tire. The belt layer 3 also has two additional cord layers at the center portion of the tread and two additional plies one on each side of the tread. Therefore, the circumferential belt layer 3 consists of the seven cord layers at the center portion of the tread and six cord layers at both side portions of the tread. The circumferential belt layer 3 may be an intersecting belt layer.

The crown protective layer 6 comprises wave-form steel cords 6a arranged in parallel with each other between the circumferential belt layer 3 and the tread 4. Moreover, between the crown protective layer 6 and the circumferential belt layer 3, the cushion rubber layer 7 made of a rubber whose modulus under 100% elongated condition is less than 70 kg/cm². A thickness h of the cushion rubber layer 7 is always more than 1.5 mm. The thickness h is the distance between the cords 3a of the circumferential belt layer 3 and the steel cords 6a of the crown protective layer 6. This distance h is referred to hereinafter "layer distance". Moreover, in order to make the tire light-weight, it is preferable to make the wave-form cords of organic fibers, for example, aromatic polyamide or aliphatic polyamide.

When the wave-form cords or the wave-form filaments are subjected to tensile forces, they are deformed in a manner that amplitudes or distances between crests and bottoms of the waves become smaller and wave lengths become longer. Upon deforming, the rubber about the cords or filaments is deformed following to the deformation of the cords or filaments.

However, as the belt layers 2 and 3 has very high rigidity, large shearing forces occur between the belt layers 2 and 3 and the crown protective layer 6 of the wave-form steel cords or wave-form filaments to cause separation therebetween.

Therefore, the cushion rubber layer 7 is provided between the crown protective layer 6 and the belt layers 2 and 3 to absorb the shearing forces resulting from the particular deformations of the wave-form cords or wave-form filaments as deformation of the rubber.

In order to realize the absorption of deformation by means of the cushion rubber layer 7, it is essential that the rubber of the cushion rubber layer 7 has the modulus under 100% elongated condition is less than 70 kg/cm². If it is more than 70 kg/cm², the effect of absorption of shearing forces is lost so that separation cannot be prevented.

Moreover, with the layer distance less than 1.5 mm, separation cannot be prevented either. Therefore, the layer distance must be more than 1.5 mm. In order to certainly obtain the layer distance more than 1.5 mm, a sheet made of rubber or a rubber layer may be provided between the crown protective layer and the belt layers. In practice, for example, ply coating rubber of belt layer 3 or crown protective layer 6 is made thick to some extent to ensure the layer distance h more than 1.5 mm. This method is advantageous in cost.

Further, in tires for aircraft or the like, worn treads are usually exchanged with new treads to recover the tires. In this case, because the cushion rubber layer keeps the layer distance between the crown protective layer and the belt layer, it is possible to peel the tread from the crown protective layer to replace with a new tread without damaging the belt layers. In this manner the recapping operation is simplified.

EXAMPLE

Tires of the size of H 46×18.OR 20 having the construction shown in FIG. 1 were manufactured with layer distances shown in Table 1. Protruded drum tests of these tires were carried out. Results are shown in the Table 1. Details of the respective layers are as follows.
Carcass:
 five layers having cords of nylon 66 1,680 d/3

Intersecting belt layer:
 having cords of nylon 66 1,680 d/4 arranged at angles of 18° relative to circumferential directions and intersecting with each other
Circumferential belt layer:
 having cords of nylon 66 1,680 d/4 extending in circumferential directions
Crown protective layer:
 construction 1×0.2+18×0.175, having wave-form steel cords of 6 mm amplitudes and 20 mm wave lengths
Cushion rubber layer:
 made of rubber of modulus 35 kg/cm² under 100% elongated condition

TABLE 1

|  | Tire according to the invention | | | Comparative tire | |
| --- | --- | --- | --- | --- | --- |
| Layer distance h (mm) | 1.7 | 2.2 | 3.6 | 0.6 | 1.0 |
| Occurrence of separation in protruded drum test | none | none | none | occurred | occurred |

Moreover, tires were manufactured which were the same in construction as the tires in the Table 1 with exception of crown protective layers having 3,000 d/3 aromatic polyamide wave-form cords with 6.7 mm amplitudes and 27 mm wave lengths and cushion rubber layers having thickness of 2.2 mm and modulus of 35 kg/cm² under 100% elongated condition.

The same tests were carried out. Any separation did not occur.

In the extruded drum test, a tire was urged against on a rotating drum having hemispherical protrusions attached thereto so as to drive the tire intermittently through a predetermined distance (three miles×50 times). Thereafter, the tire was cut to inspect whether any separation occurred. Inner pressure and load were 140 PSI and 30,940 Lbs, respectively, which were 70% of the normal inner pressure and normal load. Speed was 20 miles/hour.

Further, similar tests were effected by changing the modulus of the cushion rubber layers under 100% elongated condition. Results are shown in Table 2.

TABLE 2

|  | Tire according to the invention | | Comparative tire |
| --- | --- | --- | --- |
| Modulus under 100% elongated condition (kg/cm²) | 50 | 60 | 80 |
| Occurrence of separation | none | none | occurred |

As can be seen from the above explanation, the heavy duty pneumatic tire according to the invention is able to prevent external cuts in the tread from enlarging so that the durability can be improved. Moreover, recapping of the tire is very easy.

It is further understood by those skilled in the art that the foregoing description is that of preferred embodiments of the disclosed tires and that various changes and modifications may be made in the invention without departing from the spirit and scope thereof.

What is claimed is:

1. A heavy duty pneumatic radial tire including a toroidal carcass consisting of plies having cords arranged in parallel with each other, at least one of the plies having turn-up portions folded about a pair of bead cores from inside to outside of the tire, and a plurality of belt layers interposed between said carcass and a tread of the tire, wherein said tire comprises a crown protective layer arranged between the belt layers and the tread and comprising wave-form cords which are undulated in the plane of said crown protective layer, and a cushion rubber layer arranged between the crown protective layer and the radially outermost layer of said belt layers and made of a rubber layer not having cords or filaments and comprising a rubber having a modulus of less than 70 kg/cm$^2$ under 100% elongated condition, and a thickness over an entire width of said protective layer as a distance between a radially inner surface of said wave-form cords and a radially outer surface of cords of the radially outermost layer of said belt layers being more than 1.5 mm.

2. A heavy duty pneumatic radial tire as set forth in claim 1, wherein said modulus of the rubber of said cushion rubber is more than 20 kg/cm$^2$.

3. A heavy duty pneumatic radial tire as set forth in claim 1, wherein said distance between radially inner surface of said wave-form cords of the crown protective layer and a radially outer surface of cords of the radially outermost layer of the belt layers is more than 4.5 mm.

4. A heavy duty pneumatic radial tire as set forth in claim 1, wherein said crown protective layer comprises wave-form steel cords of amplitudes of about 6 mm and wave lengths of about 20 mm.

5. A heavy duty pneumatic radial tire as set forth in claim 1, wherein said crown protective layer comprises aromatic polyamide wave-form cords of amplitudes of about 6.7 mm and wave lengths of about 27 mm.

6. A heavy duty pneumatic radial tire as set forth in claim 1, wherein said cushion rubber layer is made of a rubber having modulus of about 35 kg/cm$^2$ under 100% elongated condition.

7. A heavy duty pneumatic radial tire as set forth in claim 6, wherein said rubber layer has a thickness of about 2.2 mm.

8. A heavy duty pneumatic radial tire including a toroidal carcass consisting of plies having cords arranged in parallel with each other, at least one of the plies having turn-up portions folded about a pair of bead cores from inside to outside of the tire, and a plurality of belt layers interposed between said carcass and a tread of the tire, wherein said tire comprises a crown protective layer arranged between the belt layers and the tread and comprising of wave-form filaments undulating in the plane of said crown protective layer, and a cushion rubber layer arranged between the crown protective layer and the radially outermost layer of said belt layers and made of a rubber layer not having cords or filaments and comprising a rubber having a modulus of less than 70 kg/cm$^2$ under 100% elongated condition, and a thickness over an entire width of aid protective layer as a distance between a radially inner surface of said wave-form filaments and a radially outer surface of cords of the outermost layer of said belt layers being more than 1.5 mm.

9. A heavy duty pneumatic radial tire as set forth in claim 8, wherein said modulus of the rubber of said cushion rubber is more than 20 kg/cm$^2$.

10. A heavy duty pneumatic radial tire as set forth in claim 8, wherein said distance between a radially inner surface of said wave-form filaments of the crown protective layer and a radially outer surface of cords of the radially outermost layer of the belt layers is more than 4.5 mm.

11. A heavy duty pneumatic radial tire as set forth in claim 8, wherein said crown protective layer comprises wave-form steel filaments having an amplitude of approximately 6 mm and a wavelength of approximately 20 mm.

12. A heavy duty pneumatic radial tire as set forth in claim 8, wherein said cushion rubber layer is made of a rubber having modulus of about 35 kg/cm$^2$ under 100% elongated condition.

13. A heavy duty pneumatic radial tire as set forth in claim 12, wherein said rubber layer has a thickness of about 2.2 mm.

* * * * *